MICROWAVE SWITCH

Filed Aug. 22, 1969 4 Sheets-Sheet 1

INVENTOR
R. H. MATSUSHIGE
G. J. LATUS JR.
BY [signature]
ATTORNEY

Jan. 26, 1971 R. H. MATSUSHIGE ET AL 3,559,109
MICROWAVE SWITCH
Filed Aug. 22, 1969 4 Sheets-Sheet 2
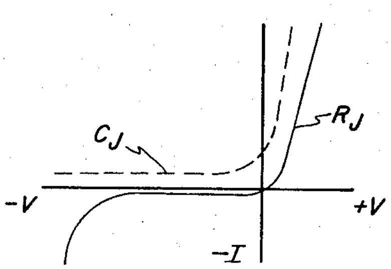
DIODE CHARACTERISTIC
FIG. 7
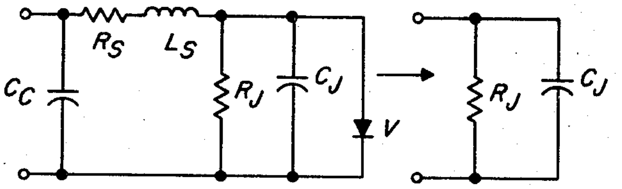
OPEN CIRCUIT CONDITION
FIG. 8
SHORT CIRCUIT CONDITION
FIG. 9
DIODE EQUIVALENT CIRCUIT
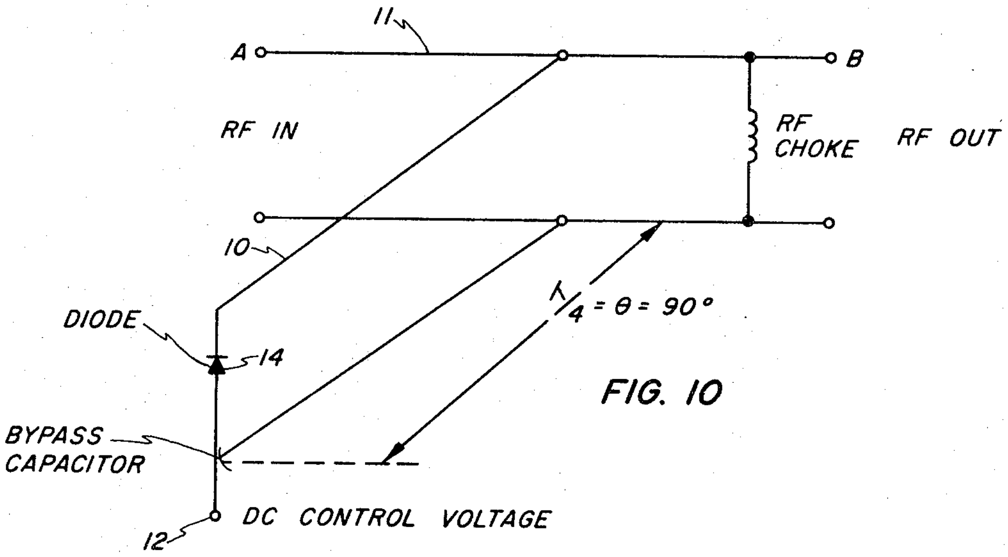
FIG. 10
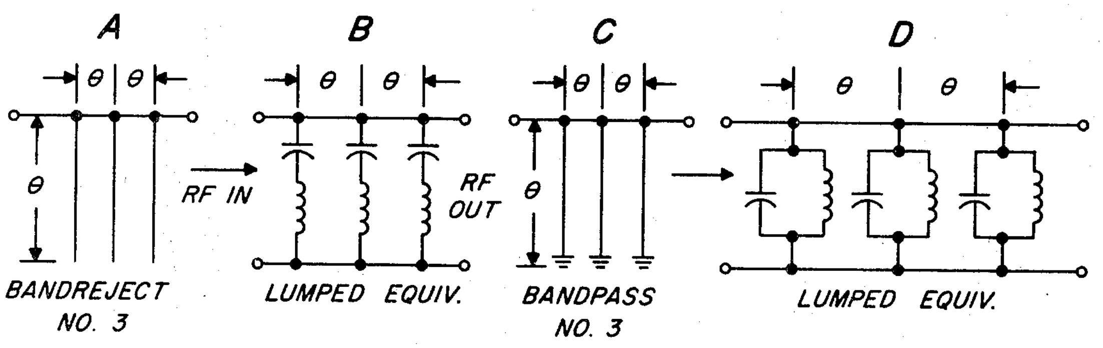
REJECT STATE PASS STATE
FIG. 11

Jan. 26, 1971 R. H. MATSUSHIGE ET AL 3,559,109

MICROWAVE SWITCH

Filed Aug. 22, 1969 4 Sheets-Sheet 3

Jan. 26, 1971 R. H. MATSUSHIGE ET AL 3,559,109

MICROWAVE SWITCH

Filed Aug. 22, 1969 4 Sheets-Sheet 4

United States Patent Office 3,559,109
Patented Jan. 26, 1971

3,559,109
MICROWAVE SWITCH

Robert H. Matsushige, Mountain View, and Gerald Joseph Latus, Jr., Los Gatos, Calif., assignors to International Telephone and Telegraph Corporation, New York, N.Y., a corporation of Delaware Filed Aug. 22, 1969, Ser. No. 852,171
Int. Cl. H01p *5/12*; H03h *7/10*
U.S. Cl. 333—7 6 Claims

ABSTRACT OF THE DISCLOSURE

A stub on a microwave line has an electrical quarterwave length equal to an odd integer of quarterwave lengths. The stub includes a switching diode that can change this effective electrical length to become a half-wave length or other even integer of a quarterwave lengths. This effective lengthening occurs when a bias is removed from the diode, and RF energy in the line back biases the diode to make it appear as a capacitance. Since the impedance of a microwave line reverses itself each quarterwave length, a short may be made to appear as an open, or an open may be made to appear as a short by the expedient of lengthening and shortening the effective electrical length of the line.

This invention relates in general to switches for controlling microwave energy and more particularly to a filter which can be switched between band pass and band rejection modes of operation responsive to a control by a low cost semiconductor switch.

The prior art has included many different means and devices for controlling microwave energy through the operation of semiconductor devices. In the communication field, switch performance requirements of these devices include a low voltage standing wave ratio, medium power handling capability, maximum rejection, minimum insertion loss, and narrow-band operation with at least a moderate switching speed. Ideally, the semiconductor device should be a switch that obtains a high ratio of rejection to forward transmission at a cost comparable to the cost of commercial or computer quality diodes.

In the past, ferrite switches, mechanical switches, reed switches, and gas tube switches have been used for so controlling the transmission of energy in the microwave spectrum. Ferrite switches that employ a magnetic field require high holding currents, have a high loss, and a poor combination of rejection, switching speed, and power handling capability. Circulator junction switches can be pulse latched to reduce the required amount of power, but it has other disadvantages. Mechanical switches are short lived, and they have slow switching speed. Reed switches are subject to a "bounce" effect, have a short life, and are disturbed by nearby magnetic fields. Gas tubes have short life, poor loss, high noise, and require high driving power. Those who are skilled in the art will readily perceive other disadvantages and short comings of known microwave switching devices.

Accordingly, an object of the invention is to provide new and improved microwave switches. Here, an object is to provide microwave switching with low loss, high rejection, high speed, and high power handling capability. Yet another object is to provide a high quality switch that will provide a switching type of characteristic (e.g. 65 db/.5 db/5 watt) which has not been available heretofore.

In keeping with one aspect of this invention, these and other objects are accomplished by providing a stub on a microwave line, the stub having an electrically effective quarterwave length. The stub includes a switching diode that can change the effective electrical length to that of a half-wave length stub. The lengthening occurs when a bias is removed from the diode, and RF energy in the line back biases the diode to make it appear as a capacitance. Since the impedance of a microwave line reverses itself each quarterwave length, a short may be made to appear as an open, or an open may be made to appear as a short by the expedient of applying or removing the bias.

While the principles of the invention have been described above in connection with specific apparatus and applications, it is to be understood that this description is made only by way of example and not as a limitation on the scope of the invention.

FIG. 1 shows an equivalent of the inventive switch;

FIG. 2 schematically shows a co-axial line having a quarterwave length stub thereon, the stub being short circuited at its outer end so that an open circuit appears at the point where the stub connects to the co-axial line;

FIG. 3 shows the same line, but with a diode therein which is used as a switch to apply the short circuit at the end of the stub;

FIG. 4 schematically shows the same line with the stub electrically lengthened to an effective one-half wave length;

FIG. 7 is a graph showing the characteristics of a diode, which is helpful toward explaining how junction capacitance is established and used in FIGS. 5 and 6;

FIG. 8 is an equivalent circuit showing the switch in an open (passage of RF energy blocked) condition;

FIG. 9 is an equivalent circuit showing the switch in a closed (passage of RF energy enabled) condition;

FIG. 10 is a schematic diagram showing where the single switch is used;

FIG. 11 shows four equivalent circuits which explain how a number of switching stages may be ganged together to improve switching;

Figure 1:
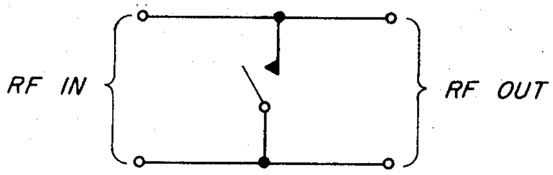

In most semiconductor switches, the switching element is operated to either one of two states. One state represents or is equivalent to the opening of a series switch, and the other state represents or is equivalent to the closing of the series switch. The invention does not use this principle. Instead, it arranges the semiconductor switch as a part of a filter arrangement in a co-axial stub on an RF transmission line. When the switch operates between its two states, it electrically phase shifts the short co-axial stub from an effective quarterwave length of an effective half-wave length. This phase shift represents or is equivalent to the closing and opening respectively, of a switch connected in series with the line. As shown in FIG. 1, the switch is closed to short circuit the line and thereby prevent passage of RF energy from the $RF_{in}$ terminals to the $RF_{out}$ terminals; or the switch is opened to enable such passage. Since the impedance of a microwave line changes each quarterwave length, this principal may be expanded by considering a quarterwave length as an odd integer of quarterwave lengths and a half-wave length as an even integer of quarterwave lengths. Thus, within reason, the following references to a quarterwave length applies to three, five, seven, etc. quarterwave lengths, and half-wave lengths applies to two, four, six, etc. quarterwave lengths.

Figure 2:
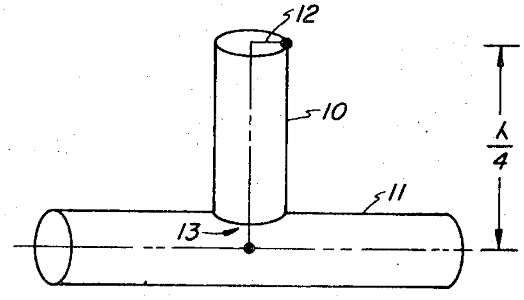
Figure 3:
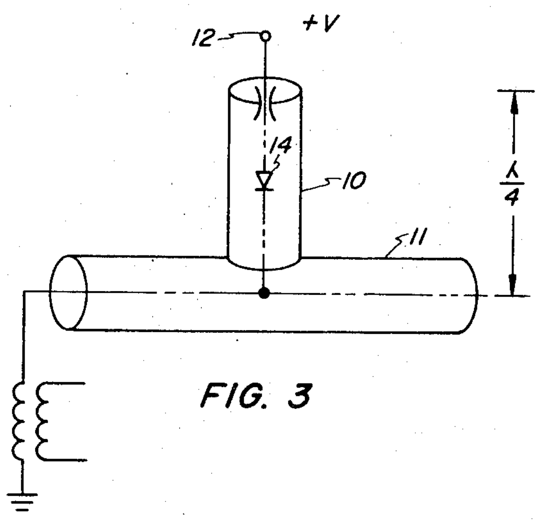

Symbolically, FIGS. 2–6 show how the theory set forth above in connection with FIG. 1 may be put into effect. In greater detail, FIG. 2 shows a quarterwave length stub 10 mounted on an RF transmission line in the form of co-axial cable 11. The characteristics of a quarterwave length stub are such that it inverts impedances at its opposite ends. Thus, if the stub is shorted at 12, it reflects an infinite impedance and looks like an open circuit at the opposite end 13. It is as if the stub were not present. When a diode 14 is placed in the stub, it may be forwardly biased to conduct and complete the short circuit at 12 or reversely biased not to conduct and open the circuit at 12. Hence, the end 12 may be made to look like either a short circuit or an open circuit according to the bias applied to the diode. Because of this, changes in the diode bias effectively connect or remove the stub, of FIG. 2, in the RF line 11. When the diode 14 is forwardly biased, as shown in FIG. 3, it causes the line 11 to transmit RF energy.

Figure 4:
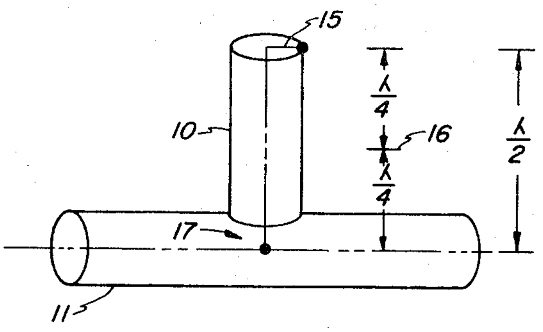
Figure 5:
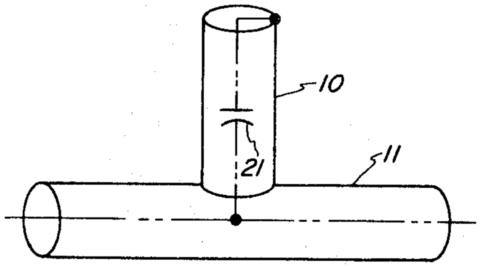
FIGS. 5 and 6 show how the capacitance of a back biased diode may be used to change the effective electrical length of the stub line.
Figure 6:
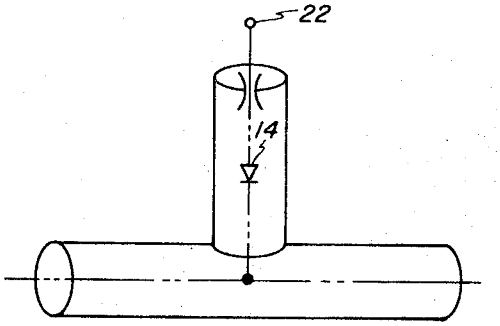

The non-conducting RF line condition is explained with the help of FIGS. 4–6. Since each quarterwave length of a co-axial line reverses the impedance, the impedance of a stub having a one half-wave length is the same at both of its two ends. Thus, a short circuit at 15 looks like an open circuit a quarterwave length away at 16 and like a short circuit a half-wave length away at 17. This short circuit blocks the transmission of RF energy through the line 11. A back biased diode does not conduct current, and the space between the "plates" formed at the junction capacitance is an insulator. Hence, the diode behaves as a capacitor behaves. Therefore, if the diode 14 is back biased, it appears as a capacitor 21 (FIG. 5) and this capacitance has the electrical effect of lengthening the stub 10. The capacitance 21 automatically appears when no bias is applied at 22 in the manner that the +V bias is applied at 12 in FIG. 3. Since there is no bias at 22, the RF energy in the line develops a back bias at the cathode of the diode 14. By a proper design, the stub may be made to look as if it is exactly one-half wave length long instead of one-quarterwave length long. Hence, the stub appears to be a short circuit across line 11 when the diode is back biased, and the RF energy cannot pass down the line.

FIG. 8 is an equivalent circuit showing how the diode may be used in a filter like arrangement, the values $R_j$ and $C_j$ being indicated by the curves in FIG. 7. The bypass capacitor formed in the waveguide is shown at $C_c$. The "on" resistance of the diode $R_s$ is shown in series with the upper wire of the equivalent circuit. The inductance $L_s$ is a lumped total value, primarily caused by the physical length of the leads. The resistance $R_j$ (sometimes also called $R_p$) is a very high resistance representing the impedance of a back biased diode. The junction capacitance $C_j$ is the resonant value of the diode in a cavity while the diode is turned off. The diode V represents a perfect valve which switches on to short circuit resistance $R_j$ and capacitance $C_j$ or off to effectively place them in the circuit.

The forwardly biased diode condition (FIG. 9) represents the situation where RF energy passes from the input and over the microwave line 11 to the output. Here, the forward resistance of $R_j$ of the diode and the junction capacitance $C_j$ are resonant at the active frequency, thus reflecting a short circuit a quarterwave length back up the waveguide. As shown in equivalent circuit FIG. 10, the microwave line 11 has a quarterwave length stub 10, connected thereto. The diode 14 is in the end of the line stub. The D.C. control or bias voltage is applied at 12 to the anode of the diode 14.

The filter-like effects of the diode switching are shown in FIG. 11. In each of these figures, the Greek letter $\theta$ designates a quarterwave, resonant cavity section. As shown in FIG. 11A, three quarterwave length stub lines 10 with diodes therein may be coupled at the end of each $\theta$ resonant cavity section in the transmission line 11. When the diode is back biased (FIG. 11 (A, B)) the junction capacitance acts as a series filter, and the stub impedance short circuits the RF line. When the diode is forwardly biased, it completes a path to ground as shown in FIGS. 11 (C, D). Reflected energy appears as a short circuit a quarterwave length away. Hence, it is as if the stub is not connected to the line.

Figure 13:
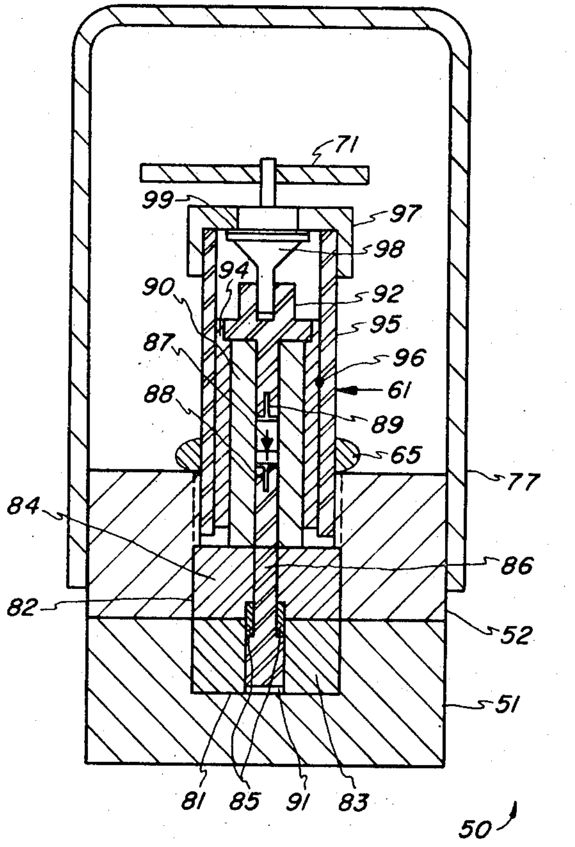
FIG. 13 is a cross-sectional view taken along line 13—13 of FIG. 12.
Figure 14:
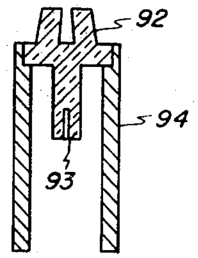
FIG. 14 is a schematic showing of one of the details of a part in FIG. 12.
Figure 12:
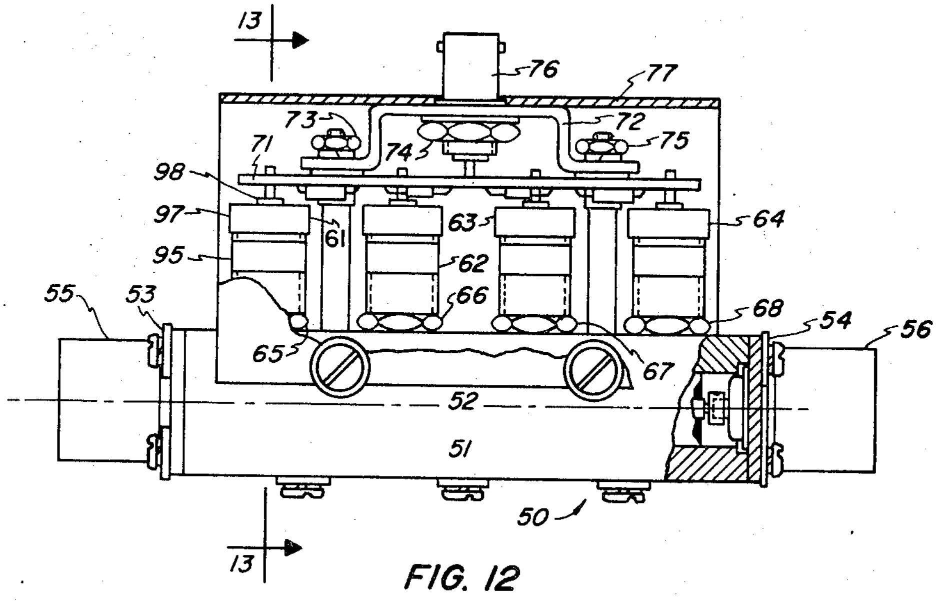
FIG. 12 is a side elevation view (partly broken away) showing a first embodiment of the inventive switch.

FIGS. 12–14 show the mechanical structure of a switch 50 embodying the electrical switching principles described in connection with FIGS. 1–11. The switch 50 comprises a two-piece body 51, 52 having entrance and exit ports 53, 54 which may be connected to a co-axial line 55, 56. Four stub lines 61–64 are secured to the body part 52 by lock nuts 65–68. The electrical connections are made to the diode anodes via a D.C. bus 71 on a printed circuit card. A suitable mechanical bracket 72 and lock nuts 73–75 provide a mechanically strong assembly for supporting the stub lines 61–64. A co-axial fitting 76 brings in the D.C. bias for the printed circuit bus 71 and the diode in the stub lines. The entire assembly is then enclosed by a dust cover 77. Unnumbered screw heads indicate where the assembly is bolted together.

The cross-sectional view (FIG. 13) shows how each of the four identical stubs 61–64 is constructed.

The two housing parts 51, 52 are made of an electrically conductive material such as brass. Suitable channels 81, 82 are routed, milled, or otherwise formed in the parts 51, 52. A dielectric material 83, 84 (preferably rigid) is fitted into the individual channels; this could be "Rexolite," a commercial insulation. The central co-axial wire or transmission line appears at 85. Electrode 86 provides an electrical connection between the RF line 85 and the diode 87, the diode connections being made by spring fingers 88, 89. The lower end of electrode 86 has an increased diameter in order to increase the capacitance across the insulation of the air gap 91 between the bottom of the electrode and the metal base 51. The other side of the diode is connected to an electrode 92 which also is metallic with the spring fingers at 89 for holding the upper diode lead. Preferably, both of the electrodes 86, 92 should be a good spring material.

The diode 87 and its two electrodes 86, 92 form the center conductor of the co-axial stub line 10. The electrode 92 is soldered to an outer sleeve 94 which forms the outer cylindrical conductor of the co-axial stub 10 (FIG. 11). A cylindrical insulator such as "Rexolite" surrounds the diode 87 and its supporting electrodes, separating them from the sleeve 94. To further complete the mechanical structure of the stub an outer sleeve 95 is slipped over the inner sleeve 94. Preferably the two sleeves are separated at 96 by an insulator; such as Mylar tape The tape 96 and insulation 83, 84, 90 are used to make a mechanically shorter structure while maintaining unchanged the effective electrical length. The upper end of the sleeve 95 is threaded to receive a cap 97 which completes the stub line structure. An RF bypass capacitor 98 (which may be an Allen Bradley type FA5D–102W capacitor) provides an entrance for applying the D.C. bias to the diode 87. A conductive spring washer 99 gives a good electrical contact between one side of the capacitor 98 and the cap 97.

When a forward D.C. bias is applied to the bus 71, and through the RF bypass capacitor 98 to the diode 87, the stub 61 is effectively short circuited; electrically as shown in FIG. 2. When the D.C. bias is removed from bus 71, the RF energy on line 85 back biases the diode 87. The capacitance of the junction makes the stub 94 appear to be twice as long, as shown in FIGS. 4–6.

The embodiment of FIGS. 12–14 illustrates the construction of a switch for lower microwave frequencies.

There, the problem of switch construction is one of making it smaller. This is accomplished by the use of techniques such as packing cavities with inslation materials to mechanically shorten the waveguide without changing its electrical length.

Figure 16:
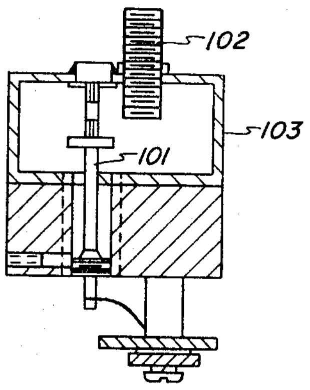
FIG. 16 is a cross-sectional view taken along line 16—16 of FIG. 15.
Figure 15:
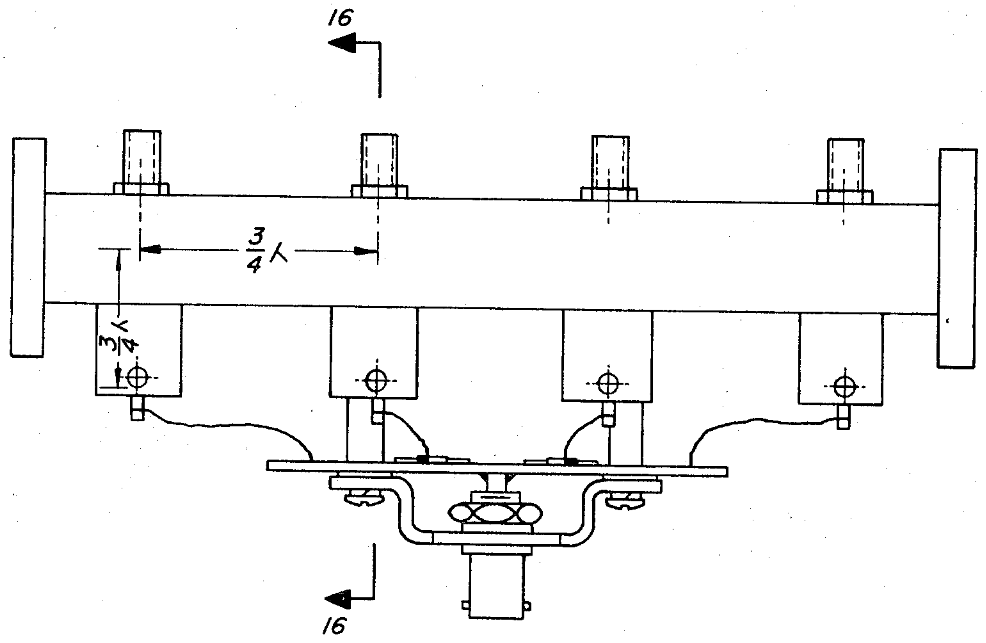
FIG. 15 is a schematic showing of a second embodiment of the inventive switch.

The embodiment of FIGS. 15, 16 illustrate the construction of a switch for the higher microwave frequencies. Here the problem is just the opposite. The switch becomes so small that it is difficult to make. There are mechanical intereferences and electrical interactions between the parts. Thus, the problem is to make the switch mechanically larger larger without making it electrically larger. According to the invention, the structure of the switch is made larger by increasing the quarterwave length sections to become three quarterwave length sections. Here, there are then three phase reversals, but the effect is the same as with the quarterwave length stub.

The structure of FIG. 15 is essentially the same as the structure of FIG. 12. However, the cross-sectional view (FIG. 16) does show some differences over the cross-sectional view of FIG. 13. Since the object is to make the stub longer, the electrode 101 has a full mechanical three-quarter wave length as well as a similar electrical wave length. It may be recalled that the embodiment of FIGS. 12–14 used insulating material 83, 84, 89 to mechanically shorten the stub without changing the electrical length.

The capacitance of the stub (FIG. 16) is set to resonate when the diode is forwardly biased to provide a minimum reflection of RF power. This capacitance is established at the end of a bolt 102 which may be moved closer to or further from the opposite of a waveguide 103. In FIG. 13, the capacitance is set by the distance across the space 91. Otherwise, the two embodiments are essentially the same.

An important advantage of the invention is that, in the open switch condition, there is an extremely high impedance between input $RF_{in}$ and $RF_{out}$. A number of switches can be cascaded to further increase this impedance, as FIG. 11 shows three such cascaded stages. As proof of the foregoing statement, consider the following:

The formula describing the co-tangent of an open line is:

(1)
$$A_R = 10 \log \left(1+\frac{G}{2V_0}\right)^2$$

(in terms of db of isolation)

If $G_e$=the admittance (inverse of impedance) of the diode
$G_{st}$=the admittance of the stub
$G_o$=the admittance of the line By substitution:

(2)
$$A_R = 10 \log \left(1+\frac{G_{st}^2}{2G_eG_o}\right)^2$$

This Formula 2 describes the normalized shunt line characteristic impedance which occurs when the diode switch places the line in the condition. It can also be shown that the unloaded "Q" of the resonance of the shunt line is:

(3)
$$A_R = 10 \log \left(1+\frac{G_0}{2G_e}\right)^2$$

if the admittance of the RF line $G_o$ is equal to the admittance of the stub $G_{st}$, the admittance of the diode is greater than or approximately equal to $10^{-2}$.

From these equations, it is a simple matter to select parameters where the peak attentuation of the diode switch is greater than 35 db. By optimizing the impedance of the stub, the attenuation is not reduced by a great amount, and the band width is increased greatly.

When RF energy is transmitted through the line, there is a great power handling capability. Stated another way, only a negligible amount of power is absorbed by the switch. The level of power absorbed can be controlled by a selection of a proper breakdown voltage for the diode.

This also can be shown mathematically:

$$P_{sw1} = \frac{V_{sw}^2}{R} = \frac{V_b}{2R}$$

(in terms of watts)

where $P_{sw1}$=the switching power
$V_{sw}$=the switching voltage
R=the impedance of the stub load
$V_b$=diode breakdown voltage For example, if R=50 ohm
$V_b$=300
$V_{sw}$=500

Then for the back biased diode condition $$P_{sw1} = \frac{300}{2.50} = 450 \text{ watts}$$

For the forward biased diode condition $$P_{sw1} = \tfrac{1}{5}(500)^2 = 5 \text{ kw.}$$

With certain diodes, the bias can be changed away from a midway point on the diode characteristic curve in order to optimize.

The point of the foregoing calculations is that the rejection or non-transmitting conditions can have an isolation impedance in the order of 90 db with approximately 0.3 db insertion loss, for example.

Some factors to consider when optimizing the switch are:

(1) The position of the diode can minimize the effect of the diode series resistance in the RF pass condition if it is located closer to the junction of the RF line and stub line. However, sacrifice is made on rejection if the diode is too close to the junction.

(2) Higher power capability and slightly broader reject band width of the switch can be obtained by decreasing the shunt line impedance.

(3) Better insertion loss can be obtained by raising the shunt line impedance.

(4) The switch's basic element of a stub line and diode can be increased to *n* numbers of elements to increase rejection, with each stub line being effectively located one quarterwave length (or some other odd integer of quarterwave lengths) away for adjacent stub lines at the design frequency.

(5) The impedance of the connecting lines can be varied slightly to obtain a Chebycheff response.

(6) The switch's operating range can be designed for as low as 100Mc and up through the X-band depending on the choice of the diode.

(7) The switching speed of the switch can be as fast as the bias network and diode allows. Other bias networks can be used so that the shunt line is mechanically shorted at its end.

(8) Multiple diodes can be used to increase the power capability and to obtain the proper phase shift for the stub line if necessary.

(9) The network can be used in a junction to form a multiple throw switch.

(10) The shunt line can be made longer to utilize the diode in the opposite state (non-conducting) for the RF pass condition. The stub line, post capacitance, and the diodes effective length is made to be electrically 180°. This will electrically short circuit the RF line at its junction to the other conductor. The diode with the stub line in the non-conducting state is made to be 270° at the design frequency for RF pass condition.

(11) The feature described in section 10 above can be used as a limiter if the diode terminals are D.C. shorted to each other.

Figure 17:
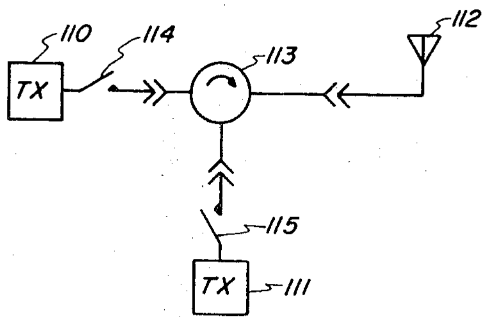
FIG. 17 is a schematic showing of one exemplary use for the invention.

FIG. 17 gives one exemplary use of the inventive switch, by way of example, only. Here, there are two transmitters 110, 111, either of which may transmit over an antenna 112. A circulator 113 is connected between the transmitters 110, 111 and antenna 112, the connections being made via switches 114, 115, constructed according to the teachings of the invention.

When switch 114 is effectively closed and switch 115 is effectively open, RF signals from transmitter 110 pass through circulator 113 to the antenna 112. No significant amount of RF energy can pass from transmitter 111 through the switch 115.

When switch 115 is effectively closed and switch 114 is effectively open, the energy from the transmitter 111 passes through switch 115, around circulator 113, to open switch 114 from which it is reflected back to the circulator, and on to the antenna 112.

Still other uses will readily occur to those who are skilled in the art.

While the principles of the invention have been described above in connection with specific apparatus and applications, it is to be understood that this description is made only by way of example and not as a limitation on the scope of the invention.

We claim:

1. A microwave switch comprising a coaxial line having an inner and outer conductor with input and output terminals with the same characteristic impedance throughout; an RF shorted branch line, a switching diode in series with the inner conductor of said branch line and said diode located near one end of the branch line; said branch line having a predetermined length in conjunction with the diode used to form an effective RF shorted line length of 90° when the diode is conducting, and 180° when the diode is non-conducting, said branch line having medium to high impedance to obtain better RF insertion loss characteristic; and means for switching said diodes at low frequency between the diode states.

2. A switch described in claim 1, wherein the diode is located adjacent to the junction of the coaxial line and branch line to diminish the effect of the diode series resistance.

3. A switch described in claim 1, wherein there are a plurality of branch lines each spaced one-quarter wave length apart, and a diode in each branch line for increasing power capability and phase shift.

4. A switch as claimed in claim 3, further comprising means for positioning said diodes to resonate when in their non-conductive state.

5. A microwave switch comprising a transmission line having an inner and outer conductor with input and output terminals; a plurality of RF shorted branch lines spaced a quarter wave length apart, a semi-conductor diode in series with the inner conductor of each branch line; a capacitive discontinuity at the junction of the transmission line and each branch line for tuning said branch lines to low and high impedance levels; each diode being located at a fixed position on the shunt line center conductor to provide proper phase shift of the shunt line for the two states of diode condition; said branch lines each having prescribed line length to form an effective shorted line length of 90° or 270° in combination with the capacitive discontinuity and dependent on the state of the diode, said branch lines each having the same specific line length to form an effective shorted line length of 180° with the diode in either state, and means for switching the state of said diodes in multiple at a low frequency without degrading the RF performance and bypass capacitance whereby to reduce further the RF leakage to the control circuitry and to control the diode state without loss of RF power to the bias structure.

6. A switch as claimed in claim 5, and means for mounting said diodes to resonate iwthin their respectively branch lines when switched to their non-conductive state.

References Cited

UNITED STATES PATENTS

| | | | |
|---|---|---|---|
| 3,069,629 | 12/1962 | Wolff | 337—7 |
| 3,245,014 | 4/1966 | Plutchok et al. | 333—97 |
| 3,309,626 | 3/1967 | Higgins | 333—17 |
| 3,417,351 | 12/1968 | Di Piazza | 333—73 |

OTHER REFERENCES

Some Designs of $X_L$-Band Diode Switches, R. N. Assaly in "IEE Transactions on Microwave Theory and Techniques," vol. MTT–14, No. 11, November 1966, TK 7800 I 23; pages 553–557.

Theory of TEM Diode Switching, R. V. Garver in "IRE Transactions on Microwave Theory and Techniques," vol. MTT–9, No. 3, May 1961, TK 7800 I 23; pages 224–226 and 232–235.

ELI LIEBERMAN, Primary Examiner

M. NUSSBAUM, Assistant Examiner

U.S. Cl. X.R.

333—73, 97